(12) United States Patent
Sung et al.

(10) Patent No.: US 9,488,843 B2
(45) Date of Patent: *Nov. 8, 2016

(54) COMPLEX SPATIAL LIGHT MODULATOR AND 3D IMAGE DISPLAY INCLUDING THE SAME

(71) Applicant: SAMSUNG ELECTRONICS CO., LTD., Suwon-si (KR)

(72) Inventors: Gee-young Sung, Daegu (KR); Hoon Song, Yongin-si (KR); Kang-hee Won, Seoul (KR); Hong-seok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

This patent is subject to a terminal disclaimer.

(21) Appl. No.: 14/063,675

(22) Filed: Oct. 25, 2013

(65) Prior Publication Data
US 2014/0118645 A1    May 1, 2014

(30) Foreign Application Priority Data
Oct. 25, 2012    (KR) ........................ 10-2012-0119292

(51) Int. Cl.
*G02B 27/22* (2006.01)
*G02F 1/1335* (2006.01)
*G03H 1/22* (2006.01)
*G02B 5/04* (2006.01)
*G02B 5/18* (2006.01)
*G03H 1/02* (2006.01)

(52) U.S. Cl.
CPC ........... *G02B 27/2214* (2013.01); *G02B 5/045* (2013.01); *G02B 5/1814* (2013.01); *G02F 1/133504* (2013.01); *G03H 1/2294* (2013.01); *G02F 2001/133538* (2013.01); *G02F 2203/12* (2013.01); *G03H 1/02* (2013.01); *G03H 2001/0224* (2013.01); *G03H 2223/18* (2013.01); *G03H 2223/19* (2013.01); *G03H 2225/33* (2013.01); *G03H 2225/55* (2013.01)

(58) Field of Classification Search
CPC ................. G02F 1/135; G02F 1/1354; G02F 1/133504; G02B 5/045; G02B 5/2214; G03H 1/2294
See application file for complete search history.

(56) References Cited

U.S. PATENT DOCUMENTS

| | | | |
|---|---|---|---|
| 8,711,466 B2* | 4/2014 | Kroll .................... | G02B 6/0046 359/291 |
| 2010/0046050 A1 | 2/2010 | Kroll et al. | |
| 2012/0092735 A1 | 4/2012 | Futterer et al. | |
| 2012/0162732 A1 | 6/2012 | Hong et al. | |
| 2013/0021545 A1 | 1/2013 | Song et al. | |
| 2013/0335795 A1* | 12/2013 | Song ..................... | G03H 1/2294 359/9 |
| 2014/0118645 A1* | 5/2014 | Sung .................. | G02B 27/2214 349/15 |
| 2014/0210960 A1* | 7/2014 | Sung .................. | G02F 1/133504 348/51 |
| 2014/0293385 A1* | 10/2014 | Smithwick ............... | G03H 1/26 359/9 |
| 2015/0205262 A1* | 7/2015 | Won ..................... | G03H 1/2294 359/9 |

* cited by examiner

*Primary Examiner* — Dung Nguyen
(74) *Attorney, Agent, or Firm* — Sughrue Mion, PLLC

(57) ABSTRACT

Provided are a complex spatial light modulator and a three-dimensional image display device including the same. The complex spatial light modulator includes: a spatial light modulator for modulating a phase of light; a prism array disposed next to the spatial light modulator; and a polarization-independent diffractive element for diffracting light that has passed through the prism array. The complex spatial light modulator may modulate both phase and amplitude of light.

18 Claims, 5 Drawing Sheets

COMPLEX SPATIAL LIGHT MODULATOR AND 3D IMAGE DISPLAY INCLUDING THE SAME

CROSS-REFERENCE TO RELATED APPLICATION

This application claims priority from Korean Patent Application No. 10-2012-0119292, filed on Oct. 25, 2012, in the Korean Intellectual Property Office, the disclosure of which is incorporated herein in its entirety by reference.

BACKGROUND

1. Field

Apparatuses consistent with exemplary embodiments relate to a complex spatial light modulator for modulating both phase and amplitude of light and a three-dimensional (3D) image display device including the same.

2. Description of the Related Art

As three-dimensional (3D) movies have recently been gaining more popularity, research is being actively conducted on techniques related to 3D image displays. 3D image display devices display 3D images based on binocular parallax. Currently commercially available 3D image displays use the binocular parallax between a viewer's eyes to provide a left-eye image and a right-eye image having different viewpoints to the left and right eyes of the viewer, respectively, thereby allowing the viewer to perceive a stereoscopic effect. 3D image display devices are classified into glasses type 3D image display devices requiring use of special glasses and non-glasses type 3D image display devices not requiring assistance of special glasses.

However, when a viewer views 3D stereoscopic images displayed by a 3D image display device using binocular parallax, the viewer's eyes will often tire. Furthermore, 3D image display devices only providing two viewpoints, i.e., the left eye's viewpoint and the right eye's viewpoint, have a limitation in providing a natural stereoscopic effect because they cannot reflect a change in viewpoints as a viewer moves.

Holographic 3D image displays have been proposed to provide more natural stereoscopic images. However, in order to realize a holographic 3D image display, there is a need for a device for controlling both amplitude and phase of light. When images are displayed using a device for controlling either the brightness (amplitude) or phase of light, twin images with zero-order diffraction beams, and speckle noise may be present in the images, thereby causing degradation of image quality.

A holographic 3D image display may include a holographic optical element in order to control an amplitude of the light. However, such a device, for example, a Bragg grating, is composed of birefringent materials, and is therefore polarization-dependent. Thus, the use of such a holographic optical element also requires the use of a polarizer and a half-wave plate, or other polarizing optical elements in order for the amplitude of the light incident on the holographic optical element to be controlled. Such additional elements add to the complexity and cost of the device. Furthermore, the "radiation effect" problem of current holographic optical elements is known. The photopolymer function of current holographic optical elements degrade over time, causing the optical performance of the image display apparatus to decay over time. Such polarization-dependent optical elements are also expensive and difficult to manufacture and are limited in size.

SUMMARY

One or more exemplary embodiments provide complex light spatial modulators capable of controlling both amplitude and phase of light.

One or more exemplary embodiments provide three-dimensional (3D) image display devices employing the complex light spatial modulators to display stereoscopic images.

Additional exemplary aspects and advantages will be set forth in part in the description which follows and, in part, will be apparent from the description, or may be learned by practice of the presented embodiments.

According to an aspect of exemplary embodiment, a complex spatial modulator includes: a spatial light modulator for modulating a phase of light; a prism array disposed such that light transmitted by the spatial light modulator is incident on the prism array; and a polarization-independent diffractive element for diffracting light that has passed through the prism array.

The prism array may include prisms and planar portions arranged alternately with each other.

The prism of the prism array may have the same height as one pixel of the spatial light modulator.

The planar portion of the prism array may have the same height as one pixel of the spatial light modulator.

The prism and the planar portion in the prism array may form a set, and first light refracted through the prism and second light transmitted by the planar portion may be combined together.

The prism and the planar portion in the prism array may form a set, and the prism may have an oblique side with a different inclination for each set.

The prism array may include a first set having a first prism with a first oblique side and a first planar portion, a second set having a second prism with a second oblique side and a second planar portion, and a third set having a third prism with a third oblique side and a third planar portion, and the first through third oblique sides may have inclinations increasing in this order.

The diffractive element may include a plurality of regions having different diffraction efficiencies according to wavelengths of light incident on the diffractive element.

The spatial light modulator may include a liquid crystal layer.

The diffractive element may be a semiconductor diffractive element including an array of protrusions and grooves.

According to an aspect of another exemplary embodiment, a 3D image display device includes: a light source unit emitting light; a spatial light modulator for modulating a phase of the light emitted by the light source unit; an image signal circuit for inputting an image signal to the spatial light modulator; and a beam combiner for modulating both phase and amplitude of the light output from the spatial light modulator. The beam combiner includes a prism array disposed such that light transmitted by the spatial light modulator is incident on the prism array and a polarization-independent diffractive element for diffracting light that has passed through the prism array.

According to an aspect of another exemplary embodiment, a complex spatial light modulator includes: a spatial light modulator comprising a plurality of pixels which modulate a phase of light transmitted therethrough; a prism array comprising a plurality of sets, each set comprising a first region and a plurality of second region, wherein the prism array is disposed such that light transmitted by the spatial light modulator is incident on the prism array; and a semiconductor diffractive element comprising an array of protrusions and grooves; wherein, in the prism array, light transmitted by the first region of a set of the prism array is diffracted in a first direction and light transmitted by the second region of the set of the prism array is diffracted in a second direction different from the first direction, and wherein light transmitted by the first region of the set of the prism array and light transmitted by the second region of the set of the prism array are combined upon transmission through the diffractive element.

According to an aspect of another exemplary embodiment, a three-dimensional image display device includes: a light source unit which emits light; a spatial light modulator which modulates a phase of light emitted by the light source unit; an image signal circuit which inputs an image signal to the spatial light modulator; and a beam combiner which modulates both a phase and an amplitude of light output from the spatial light modulator, wherein the beam combiner includes:

a prism array comprising a plurality of sets, each set comprising a first region and a plurality of second region, wherein the prism array is disposed such that light transmitted by the spatial light modulator is incident on the prism array; and a semiconductor diffractive element comprising an array of protrusions and grooves;

wherein, in the prism array, light transmitted by the first region of a set of the prism array is diffracted in a first direction and light transmitted by the second region of the set of the prism array is diffracted in a second direction different from the first direction, and wherein light transmitted by the first region of the set of the prism array and light transmitted by the second region of the set of the prism array are combined upon transmission through the diffractive element.

BRIEF DESCRIPTION OF THE DRAWINGS

These and/or other exemplary aspects and advantages will become apparent and more readily appreciated from the following description of exemplary embodiments, taken in conjunction with the accompanying drawings of which.

DETAILED DESCRIPTION

Figure 1:
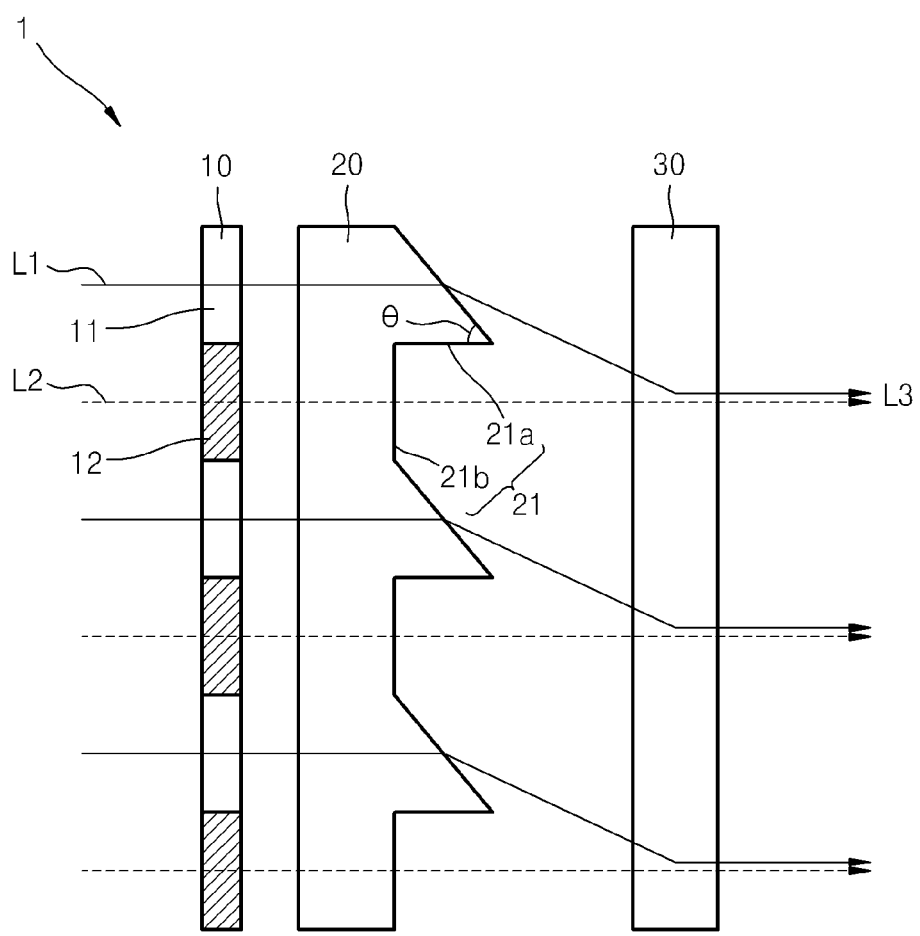
FIG. 1 schematically illustrates a complex spatial light modulator (SLM) according to an exemplary embodiment.

Reference will now be made in detail to embodiments, examples of which are illustrated in the accompanying drawings, wherein like reference numerals refer to the like elements throughout. In the drawings, the dimensions and thicknesses of layers and regions may be exaggerated for clarity. The present embodiments may have different forms and should not be construed as being limited to the descriptions set forth herein. Accordingly, the embodiments are merely described below, by referring to the figures, to explain aspects of the present description.

FIG. 1 schematically illustrates a complex spatial light modulator 1 according to an exemplary embodiment. The complex SLM 1 according to the present embodiment includes a SLM 10 for modulating a phase of a beam and a beam combiner for combining together beams output from the SLM 10.

The SLM 10 includes a photoelectric material layer (not shown) that has a refractive index which changes according to an electrical signal. For example, the photoelectric material layer may include a liquid crystal (LC) layer or a polymer dispersed LC layer. The photoelectric material layer has a refractive index that changes upon application of a voltage. By using the refractive index changes, the SLM 10 controls the phase of light exiting the SLM 10. The length of an optical path may change in accordance with a voltage applied to the polymer dispersed LC layer, thereby resulting in modulation of a phase of light. Furthermore, according to the characteristics of the photoelectric material layer, phase retardation may occur, causing a change in polarization direction. Although not shown, the complex SLM 1 may further include a phase plate and a polarizing plate disposed next to the SLM 10 in order to correct the change in polarization direction.

The SLM 10 may include a plurality of pixels 11 and 12 arranged in a two-dimensional (2D) matrix with rows and columns and a plurality of prisms, one for each row of pixels. One prism may be provided for each pixel. Alternatively, one planar portion may be provided for each row of pixels or for each pixel.

The beam combiner includes a prism array 20 and a diffractive element 30. For example, the diffractive element 30 may be a grating. The prism array 20 includes a plurality of prisms 21a for refracting incident light and a plurality of planar portions 21b for transmitting incident light wherein the prisms 21a and the planar portions 21b are arranged alternately with each other. Each of the plurality of prisms 21a may correspond to one pixel in the SLM 10 while each planar portion 21b corresponds to another pixel in the SLM 10. The prism 21a and the planar portion 21b each may have the same height as one pixel in the SLM 10. In this case, the height refers to a height in a vertical direction of a 3D image display device exploiting the complex SLM 1 according to the present embodiment. The prism 21a and the planar portion 21b in the prism array 20 form a set 21, and two pixels in the SLM 10 corresponding to the prism 21a and the planar portion 21b form a pair.

In the SLM 10, a first pixel 11 and a second pixel 12 are created in pairs. First light L1 passing through the first pixel 11 and second light L2 passing through the second pixel 12 are combined together by the beam combiner, thereby resulting in modulation of phase and amplitude of light.

The first light L1 enters the prism 21a of the prism array 20 and is refracted at a predetermined angle while the second light L2 passes through the planar portion 21b of the prism array 20. The first light L1 and the second light L2 are then incident on and are diffracted by the diffractive element 30.

Figure 5:
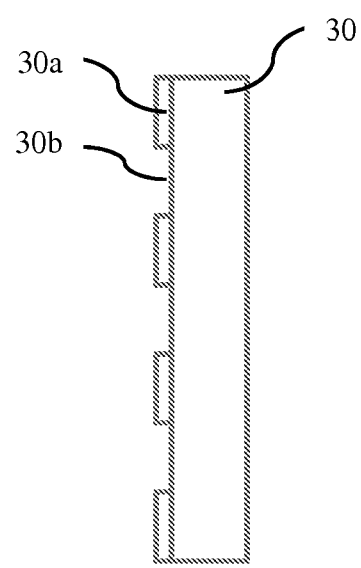
FIG. 5 is a cross-sectional view of a semiconductor diffracting element according to an exemplary embodiment.

For example, the diffractive element 30 may include a semiconductor diffractive element manufactured using a semiconductor manufacturing process to have a plurality of protrusions 30a and grooves 30b that are arranged at a predetermined pitch, thus forming a relief shape on the surface of the diffracting element 30, as shown in FIG. 5. The angle of diffraction of the light may be controlled by adjusting a pitch of the plurality of grooves in the diffractive element 30. The diffraction efficiency may also be controlled by a depth of the plurality of grooves. The diffraction efficiency may vary with a wavelength and an angle of incidence of light incident on the diffractive element 30. The diffractive element 30 may be designed to have a maximum diffraction efficiency for a wavelength of light used and an angle of incidence of light incident thereon through the prism array 20. Thus, the diffractive element 30 may have a low diffraction efficiency for light having a wavelength and an angle of incidence that do not match the design requirements of the diffractive element 30. The diffractive element 30 may be designed to have a high diffraction efficiency for the first light L1 and the second light L2 that have passed through the prism array 20. The diffractive element 30 combines the first light L1 and the second light L2 together to thereby output third light L3 having phase and amplitude modulated.

A diffracting element as described above, and as illustrated in FIG. 5 is not limited in size, and can be manufactured to be very large. Additionally, because the diffracting element is a semiconductor diffractive grating, it is not polarization dependent and it provides multi-order diffraction, as discussed below.

For example, when the first light L1 and the second light L2 transmitted through the SLM 10 have a first phase $\phi_1$ and a second phase $\phi_2$, respectively, and are combined together, the following equation is satisfied:

$$\frac{1}{2}e^{i\phi_1(x,y)} + \frac{1}{2}e^{i\phi_2(x,y)} = \cos\left(\frac{\phi_1 - \phi_2}{2}\right)\exp\left[i\left(\frac{\phi_1 + \phi_2}{2}\right)\right] \quad (1)$$

The cosine term and the exp term on the right side of the Equation (1) are related to an amplitude and a phase, respectively. When the first light L1 having the first phase $\phi_1$ and the second light L2 having the second phase $\phi_2$ are combined into a beam having a single optical axis, both the phase and amplitude are modulated. The complex SLM 1 uses the prism array 20 and the diffractive element 30 to combine a plurality of beams into a beam having a single optical axis.

Referring to FIG. 1, the prism 21a of the prism array 20 has an oblique side inclined at an angle θ with respect to a horizontal axis while the planar portion 21b is a plane perpendicular to the horizontal axis. The horizontal axis denotes an axis in a horizontal direction of a 3D image display device employing the complex SLM 1 according to the present embodiment. However, the structure of the prism array 20 is not limited thereto, and the prism array 20 may include a plurality of prisms having oblique sides inclined at different angles. For example, the planar portion 21b may be replaced with another prism having an angle less than 90 degrees with the horizontal axis. However, it is desirable to have the planar portions 21b because transmitting the second light L2 through the planar portions 21b, without refraction, allows easier control of light than refracting the second light L2 through the prisms 21a.

Furthermore, each of the prisms 21a of the prism array 20 may have an oblique side inclined at the same angle θ.

Figure 2:
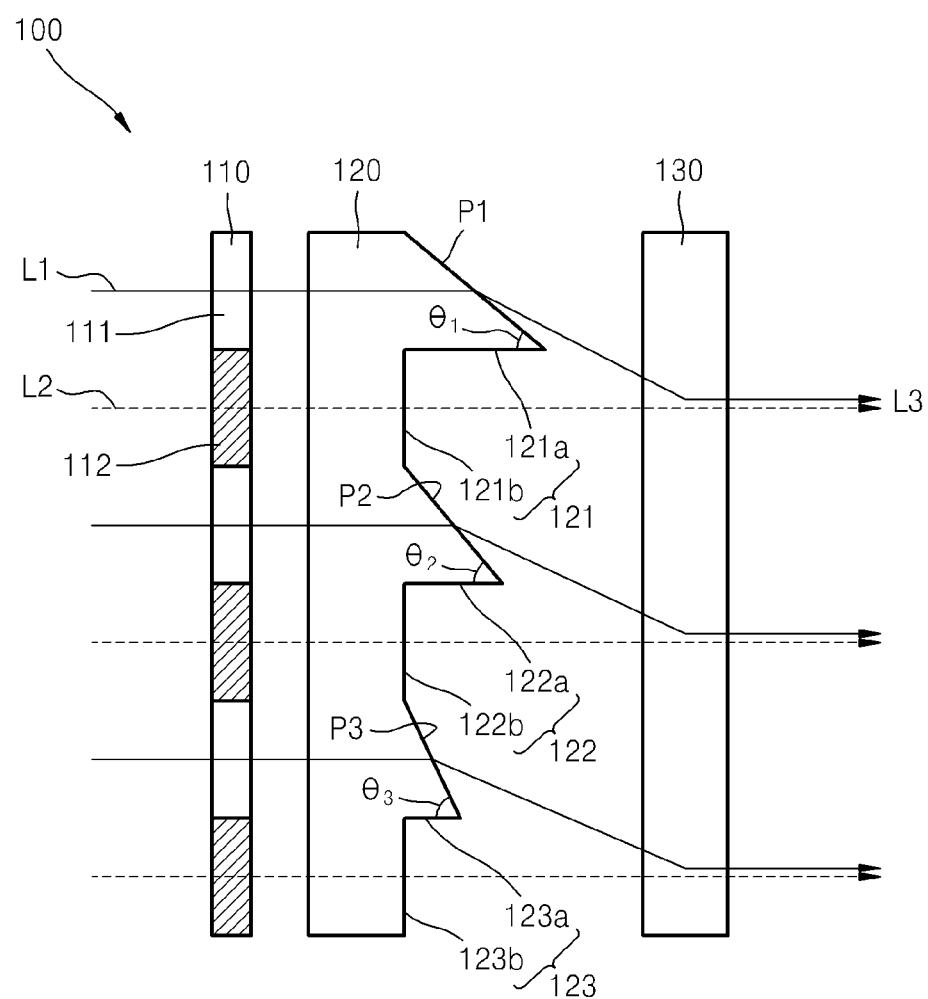
FIG. 2 schematically illustrates a complex SLM according to another exemplary embodiment.

FIG. 2 schematically illustrates a complex SLM 100 according to another exemplary embodiment. Referring to FIG. 2, the complex SLM 100 includes a SLM 110 for modulating a phase of a beam and a beam combiner for combining a plurality of beams output from the SLM 110.

The SLM 110 includes a photoelectric material layer that has a refractive index that changes according to an electrical signal. The SLM 110 includes a plurality of pixels 111 and 112. For example, the plurality of pixels 111 and 112 may be arranged in a 2D matrix.

The beam combiner includes a prism array 120 and a diffractive element 130. For example, the diffractive element 130 may be a grating. The prism array 120 includes a plurality of sets 121 through 123, each set including a prism 121a (122a or 123a) for refracting incident light and a planar portion 121b (122b or 123b) for transmitting incident light without refraction. The prisms 121a through 123a in the plurality of sets 121 through 123 may have oblique sides with different inclinations. More specifically, the plurality of sets 121 through 123 includes a first set 121 having a first prism 121a with a first oblique side P1 and a first planar portion 121b, a second set 122 having a second prism 122a with a second oblique side P2 and a second planar portion 122b, and a third set 123 having a third prism 123a with a third oblique side P3 and a third planar portion 123b. The first through third oblique sides P1 through P3 respectively have first through third inclination angles θ1, θ2 and θ3. The first through third inclination angles θ1, θ2 and θ3 may be different from each other. For example, the first through third oblique sides P1 through P3 may be inclined at angles θ1, θ2 and θ3 where θ1<θ2<θ3. However, the prism array 120 is not limited thereto, and may have any of various other structures. Each of the first through third oblique sides P1 through P3 may have an inclination angle which is varied based on a wavelength of light to be transmitted therethrough. Thus, the different inclination angles of the first through third sides may be determined in order to diffract red, green, and blue light, respectively, such that red light transmitted through the first set 111, green light transmitted through the second set 122, and blue light transmitted through the third set 123 is respectively combined by the diffractive element 130, which is substantially uniform. Alternatively, the prism array 120 may include the plurality of sets 121 through 123 repeatedly arranged.

Each of the first through third prisms 121a through 123a may have the same height as one pixel in the SLM 110. The height of the prism 121a, 122a, or 123a refers to a maximum height that can be measured in a vertical direction of the prism 121a, 122a, or 123a. For example, the plurality of pixels 111 and 112 in the SLM 110 may be arranged in a matrix, each row of the plurality of pixels 111 and 112 corresponding to one prism in the prism array 120. Alternatively, one prism may be provided for each pixel. Likewise, one planar portion may be provided for each pixel or each row of the plurality of pixels.

Each of the first through third planar portions 121b through 123b may have the same height as one pixel in the SLM 110. In this case, the height refers to a height in a vertical direction of a 3D image display device exploiting the complex SLM 100 according to the present embodiment. The prism 121a (122a or 123a) and the planar portion 121b (122b or 123b) in the prism array 120 form a set 121 (122 or 123), and two pixels in the SLM 110 corresponding to the prism 121a (122a or 123a) and the planar portion 121b (122b or 123b) form a pair. The first and second pixels 111 and 112 in the SLM 110 form one pair, and the first light L1 and the second light L2 respectively passing through the first and second pixels 111 and 112 are combined by the beam combiner to thereby output a beam having modulated phase and amplitude.

The first light L1 enters each of the first through third prisms 121a through 123a of the prism array 120 and is refracted at a different angle as it leaves the prism 121a, 122a, or 123a while the second light L2 passes through the planar portion 121b, 122b, or 123b. The first light L1 and the second light L2 are then incident on and are diffracted by the diffractive element 130.

The diffractive element 130 may be substantially uniform as described above, or may have a diffraction efficiency that varies with a wavelength and an angle of incidence of the light incident on the diffractive element 130. The diffractive element 130 may be designed to have a maximum diffraction efficiency for a wavelength of light to be used and an angle of incidence of light incident thereon through the prism array 120. Thus, the diffractive element 130 may have a low diffraction efficiency for light having a wavelength and an angle of incidence that do not match the design requirements of the diffractive element 130. The diffractive element 130 may be designed to have a high diffraction efficiency for the first light L1 and the second light L2 that pass through the prism array 120. For example, each of the first through third sets 121 through 123 of the prism array 120 may adjust the incidence angle of the light incident on the diffractive element 130 so as to achieve a high diffraction efficiency for light of a different wavelength. More specifically, the first through third prisms 121a, 122a, and 123a may refract light having a first wavelength, light having a second wavelength, and light having a third wavelength, respectively. The diffractive element 130 combines the first light L1 and the second light L2 respectively passing through the prism 121a, 122a, or 123a of each set 121, 122, or 123 and the planar portion 121b, 122b, or 123b to thereby output third light L3 having phase and amplitude modulated together.

Figure 3:
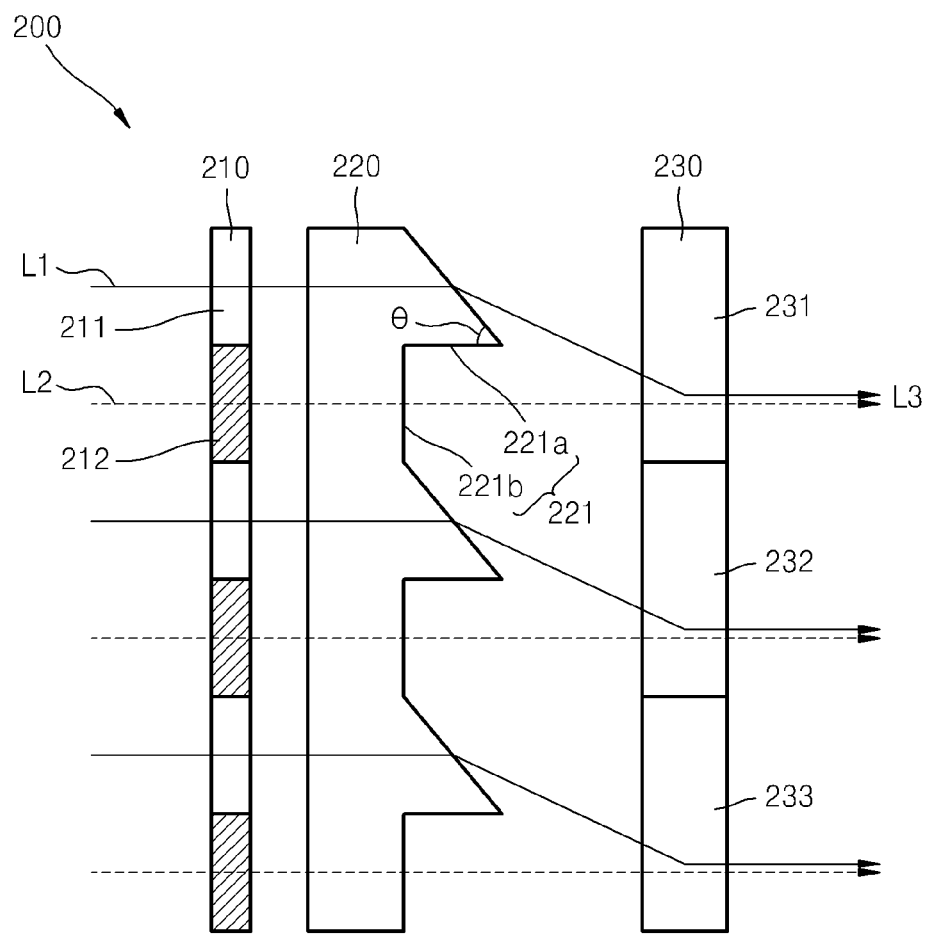
FIG. 3 schematically illustrates a complex SLM according to another exemplary embodiment.

FIG. 3 schematically illustrates a complex SLM 200 according to another exemplary embodiment. Referring to FIG. 3, the complex SLM 200 includes a SLM 210 for modulating a phase of a beam and a beam combiner for combining together a plurality of beams output from the SLM 210.

The SLM 210 includes a photoelectric material layer that has a refractive index that may change according to an electrical signal. The SLM 210 includes a plurality of pixels 211 and 212. For example, the plurality of pixels 211 and 212 may be arranged in a 2D matrix.

The beam combiner includes a prism array 220 and a diffractive element 230. For example, the diffractive element 230 may be a grating. The prism array 220 includes a plurality of sets 221, each set having a prism 221a for refracting incident light and a planar portion 221b for transmitting incident light without refraction. The prism 221a in each set 221 may have an oblique side inclined at the same angle θ.

The plurality of pixels 211 and 212 in the SLM 210 may be arranged in a matrix, each row of the plurality of pixels 211 and 212 corresponding to one prism 221a in the prism array 220. Alternatively, one prism 221a may be provided for each pixel. Likewise, one planar portion 221b may be provided for each pixel or each row of the plurality of pixels 211 and 212.

The prism 221a and the planar portion 221b each may have the same height as one pixel in the SLM 210. In this case, the height refers to a height in a vertical direction of a 3D image display device exploiting the complex SLM 200 according to the present embodiment. The prism 221a and the planar portion 221b in the prism array 220 form a set 221, and two pixels in the SLM 210 corresponding to the prism 221a and the planar portion 221b form a pair. The first and second pixels 211 and 212 in the SLM 210 form one pair, and the first light L1 and the second light L2 respectively passing through the first and second pixels 211 and 212 are combined by the beam combiner to thereby output a beam having modulated phase and amplitude.

The first light L1 enters the prism 221a of the prism array 120 and is refracted at a predetermined angle while the second light L2 passes through the planar portion 221b without refraction. The first light L1 and the second light L2 are then incident on and are diffracted by the diffractive element 230.

The diffractive element 230 may have a diffraction efficiency that varies with the wavelength and an angle of incidence of light incident on the diffractive element 230. The diffractive element 230 may include a plurality of regions patterned to have a high diffraction efficiency for a particular wavelength of incident light. Referring to FIG. 3, the diffractive element 230 includes a first region 231 having a high diffraction efficiency for light having a first wavelength, a second region 232 having a high diffraction efficiency for light having a second wavelength, an a third region 233 having a high diffraction efficiency for light having a third wavelength.

The first through third regions 231 through 233 may be arranged repeatedly. The diffractive element 230 combines the first light L1 and the second light L2 respectively passing through the prism 221a and the planar portion 221b of each set together to thereby output third light L3 having phase and amplitude modulated together. According to the present embodiment, the diffractive element 230 may be designed to have a maximum diffraction efficiency for each wavelength, thereby providing high light efficiency.

As described above, a complex SLM according to the one or more of the above embodiments uses a SLM to modulate a phase of light and a beam combiner to modulate both phase and amplitude of light. A complex SLM according to the described embodiments allows modulation of both phase and amplitude of light, thereby preventing degradation in image quality due to twin images or speckle. A SLM and a beam combiner are also arranged parallel to each other, thereby facilitating optical alignment. Furthermore, use of slim SLM and beam combiner may reduce the overall size of a complex SLM. Thus, complex SLMs may be used in flat panel displays (FPDs).

Complex SLMs according to exemplary embodiments may apply to a holographic 3D image display, thereby allowing display of realistic 3D images.

Figure 4:
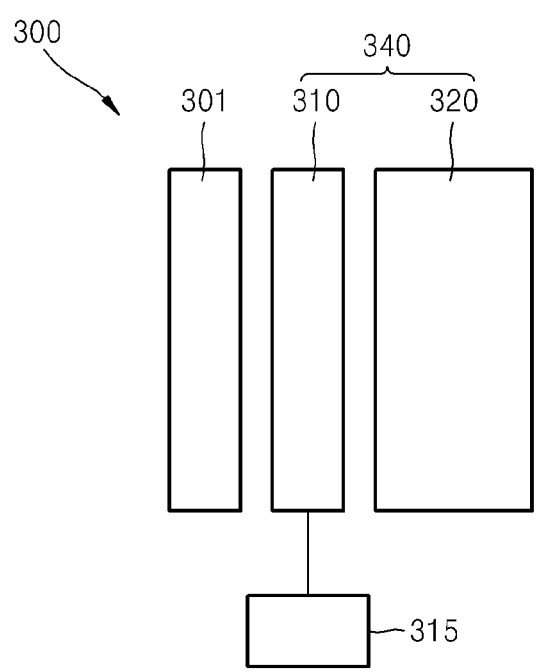
FIG. 4 schematically illustrates a three-dimensional (3D) image display device according to an exemplary embodiment.

FIG. 4 schematically illustrates a 3D image display device 300 according to an exemplary embodiment.

The 3D image display device 300 includes a light source unit 301 emitting light and a complex SLM 340 for displaying 3D images using the light emitted by the light source unit 301. The complex SLM 340 includes a SLM 310 for modulating a phase of light and a beam combiner 320 for combining a plurality of beams output from the SLM 310 and outputting a beam having modulated phase and amplitude. The complex SLM 340 may further include an image signal circuit 315 for inputting a holographic image signal to the SLM 310. The complex SLM 340 may be one of the complex SLMs 1, 100, and 200 described with reference to FIGS. 1 through 3. The complex SLM may be slimly manufactured, and used in a flat-panel holographic 3D image display device to provide high quality 3D images.

While exemplary embodiments have been particularly shown and described with reference to the accompanying drawings, it should be understood by those of ordinary skill in the art that the exemplary embodiments described herein should be considered in a descriptive sense only and not for purposes of limitation and that various changes in form and details may be made therein. Descriptions of features or aspects within each embodiment should typically be considered as available for other similar features or aspects in other embodiments. The scope of the inventive concept is defined not by the detailed description but by the appended claims.

What is claimed is:

1. A complex spatial light modulator comprising:
   a spatial light modulator which modulates a phase of light transmitted therethrough;
   a prism array disposed such that light transmitted by the spatial light modulator is incident on the prism array; and
   a polarization-independent diffractive element which diffracts light transmitted by the prism array,
   wherein the prism array comprises prisms and planar portions arranged alternately with each other, and
   wherein the prism array comprises a plurality of sets, each set comprising a prism and a planar portion, wherein first light refracted by the prism and second light transmitted through the planar portions are combined upon transmission through the polarization-independent diffractive element.

2. The modulator of claim 1, wherein each of a plurality of prisms of the prism array has a height which is the same as a height of one pixel of the spatial light modulator.

3. The modulator of claim 1, wherein each of the plurality of planar portions of the prism array has a height which is the same as a height of one pixel of the spatial light modulator.

4. The modulator of claim 1, wherein the prism has an oblique side inclined with respect to the planar portion at an angle different from an angle at which an oblique side of a prism of another set is inclined.

5. The modulator of claim 4, wherein the prism array comprises:
   a first set comprising a first prism with a first oblique side and a first planar portion, wherein the first oblique side is inclined at first angle with respect to the first planar portion;
   a second set comprising a second prism with a second oblique side and a second planar portion, wherein the second oblique side is inclined at a second angle, greater than the first angle, with respect to the second planar portion; and
   a third set comprising a third prism with a third oblique side and a third planar portion, wherein the third oblique side is inclined at a third angle, greater than the second angle, with respect to the third planar portion.

6. The modulator of claim 1, wherein the polarization-independent diffractive element comprises a plurality of regions having different diffraction efficiencies.

7. The modulator of claim 1, wherein the spatial light modulator comprises a liquid crystal layer.

8. The modulator of claim 1, wherein the polarization-independent diffractive element is a semiconductor diffractive element comprising an array of protrusions and grooves.

9. A three-dimensional image display device comprising:
   a light source unit which emits light;
   a spatial light modulator which modulates a phase of light emitted by the light source unit;
   an image signal circuit which inputs an image signal to the spatial light modulator; and
   a beam combiner which modulates both a phase and an amplitude of light output from the spatial light modulator,
   wherein the beam combiner comprises a prism array disposed such that light transmitted by the spatial light modulator is incident on the prism array and a polarization-independent diffractive element which diffracts light transmitted by the prism array,
   wherein the prism array comprises prisms and planar portions arranged alternately with each other, and
   wherein the prism array comprises a plurality of sets, each set comprising a prism and a planar portion, wherein first light refracted by the prism and second light transmitted through the planar portion are combined upon transmission through the polarization-independent diffractive element.

10. The device of claim 9, wherein each of a plurality of prisms of the prism array has a height which is the same as a height of one pixel of the spatial light modulator.

11. The device of claim 9, wherein each of a plurality of planar portions of the prism array has a height which is the same as a height of one pixel of the spatial light modulator.

12. The device of claim 9, wherein first light refracted by the prism and second light transmitted through the planar portion are combined upon transmission through the polarization-independent diffractive element.

13. The device of claim 9, wherein the prism array comprises a plurality of sets each set comprising a prism and a planar portion, wherein, for each of the plurality of sets, the prism has an oblique side inclined with respect to the planar portion at an angle different from an angle at which an oblique side of a prism of another set is inclined.

14. The device of claim 13, wherein the prism array comprises:
   a first set comprising a first prism with a first oblique side and a first planar portion, wherein the first oblique side is inclined at first angle with respect to the first planar portion;
   a second set comprising a second prism with a second oblique side and a second planar portion, wherein the second oblique side is inclined at a second angle, greater than the first angle, with respect to the second planar portion; and
   a third set comprising a third prism with a third oblique side and a third planar portion, wherein the third oblique side is inclined at a third angle, greater than the second angle, with respect to the third planar portion.

15. The device of claim 9, wherein the polarization-independent diffractive element comprises a plurality of regions having different diffraction efficiencies.

16. The device of claim 9, wherein the polarization-independent diffractive element is a semiconductor diffractive element comprising an array of protrusions and grooves.

17. A complex spatial light modulator comprising:
   a spatial light modulator comprising a plurality of pixels which modulate a phase of light transmitted therethrough;
   a prism array comprising a plurality of sets, each set comprising a first region and a plurality of second region, wherein the prism array is disposed such that light transmitted by the spatial light modulator is incident on the prism array; and
   a semiconductor diffractive element comprising an array of protrusions and grooves;
   wherein, in the prism array, light transmitted by the first region of a set of the prism array is diffracted in a first direction and light transmitted by the second region of the set of the prism array is diffracted in a second direction different from the first direction,
   wherein light transmitted by the first region of the set of the prism array and light transmitted by the second region of the set of the prism array are combined upon transmission through the semiconductor diffractive element, and wherein the first region of each of the plurality of sets of the prism array comprises a prism, the second region of each of the plurality of sets of the prism array comprises a planar portion, wherein the prism has an oblique side which is inclined with respect to the planar portion.

18. A three-dimensional image display device comprising:
a light source unit which emits light;
a spatial light modulator which modulates a phase of light emitted by the light source unit;
an image signal circuit which inputs an image signal to the spatial light modulator; and
a beam combiner which modulates both a phase and an amplitude of light output from the spatial light modulator,
wherein the beam combiner comprises:
  a prism array comprising a plurality of sets, each set comprising a first region and a plurality of second region, wherein the prism array is disposed such that light transmitted by the spatial light modulator is incident on the prism array; and
  a semiconductor diffractive element comprising an array of protrusions and grooves;
wherein, in the prism array, light transmitted by the first region of a set of the prism array is diffracted in a first direction and light transmitted by the second region of the set of the prism array is diffracted in a second direction different from the first direction,
wherein light transmitted by the first region of the set of the prism array and light transmitted by the second region of the set of the prism array are combined upon transmission through the semiconductor diffractive element, and
wherein the first region of each of the plurality of sets of the prism array comprises a prism, the second region of each of the plurality of sets of the prism array comprises a planar portion, wherein the prism has an oblique side which is inclined with respect to the planar portion.

* * * * *